United States Patent
Fu et al.

(10) Patent No.: US 12,143,811 B2
(45) Date of Patent: Nov. 12, 2024

(54) PRIVACY MANAGEMENT

(71) Applicant: Nokia Technologies Oy, Espoo (FI)

(72) Inventors: Anmin Fu, Xi'an (CN); Jingyu Feng, Xi'an (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 287 days.

(21) Appl. No.: 17/607,745

(22) PCT Filed: May 7, 2019

(86) PCT No.: PCT/CN2019/085903
§ 371 (c)(1),
(2) Date: Oct. 29, 2021

(87) PCT Pub. No.: WO2020/223908
PCT Pub. Date: Nov. 12, 2020

(65) Prior Publication Data
US 2022/0225086 A1 Jul. 14, 2022

(51) Int. Cl.
*H04W 12/02* (2009.01)
*G06N 3/084* (2023.01)
*H04W 12/64* (2021.01)

(52) U.S. Cl.
CPC ............ *H04W 12/02* (2013.01); *G06N 3/084* (2013.01); *H04W 12/64* (2021.01)

(58) Field of Classification Search
CPC ....... H04W 12/02; H04W 12/64; G06N 3/084
(Continued)

(56) References Cited

U.S. PATENT DOCUMENTS 8,555,400 B2 * 10/2013 Shi ................... H04L 9/3006
380/278
8,627,488 B2 * 1/2014 Cormode ......... G11B 20/00086
726/28
(Continued)

FOREIGN PATENT DOCUMENTS

CN 104754509 A 7/2015
CN 106960256 A 7/2017
(Continued)

OTHER PUBLICATIONS

Peng et al., "Collaborative Trajectory Privacy Preserving Scheme in Location-based Services", Information Sciences: an International Journal, vol. 387, No. C, May 2017, pp. 165-179.
(Continued)

*Primary Examiner* — Amare F Tabor
(74) *Attorney, Agent, or Firm* — ALSTON & BIRD LLP (57) ABSTRACT

According to an example aspect of the present invention, there is provided an apparatus comprising at least one processing core, at least one memory including computer program code, the at least one memory and the computer program code being configured to, with the at least one processing core, cause the apparatus at least to process a time series of location information elements, indicating a series of past locations of the apparatus, for input to an input layer of an artificial neural network, provide the processed time series of location information elements to the input layer of the artificial neural network, to obtain as output of the artificial neural network a predicted current location of the apparatus, and provide the predicted current location of the apparatus to a network entity as a current location of the apparatus.

18 Claims, 5 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 10,489,605 | B2* | 11/2019 | Nerurkar | ................ G06F 17/16 |
| 11,176,272 | B2* | 11/2021 | Richardson | ......... G06F 21/6254 |
| 11,592,829 | B2* | 2/2023 | Kobayashi | ........... G05D 1/0238 |
| 11,698,990 | B2* | 7/2023 | McFall | ................ H04L 9/0844 |
| | | | | 726/26 |
| 2011/0123028 | A1* | 5/2011 | Karabinis | ............... H04L 1/009 |
| | | | | 380/255 |
| 2015/0330805 | A1 | 11/2015 | Cho et al. | |

FOREIGN PATENT DOCUMENTS

| | | |
|---|---|---|
| CN | 107205225 A | 9/2017 |
| EP | 1455198 A2 | 9/2004 |

OTHER PUBLICATIONS

Cao et al., "Differentially private real-time data release over infinite trajectory streams", 16th IEEE International Conference on Mobile Data Management, Jun. 15-18, 2015, pp. 68-73.

Samarati et al., "Protecting privacy when disclosing information: k-anonymity and its enforcement through generalization and suppression", Technical Report, SRI International, 1998, pp. 1-19.

Machanavajjhala et al., "L-diversity: privacy beyond k-anonymity", 22nd International Conference on Data Engineering (ICDE'06), Apr. 3-7, 2006, 12 pages.

Soria-Comas e al., "t-closeness through micro aggregation: Strict privacy with enhanced utility preservation", IEEE Transactions on Knowledge and Data Engineering, vol. 27, No. 11, Nov. 1, 2015, pp. 3098-3110.

Dwork, "Differential Privacy", International Colloquium on Automata, Languages, and Programming, 2006, p. 1-12.

Dwork et al., "Calibrating noise to sensitivity in private data analysis", Theory of Cryptography Conference, 2006, pp. 265-284.

Chen et al., "Differentially Private Trajectory Data Publication", arXiv, Dec. 9, 2011, 12 pages.

He et al., "DPT: differentially private trajectory synthesis using hierarchical reference systems", Proceedings of the VLDB Endowment, vol. 8, No. 11, Jul. 2015, pp. 1154-1165.

Yu et al., "Dynamic Differential Location Privacy with Personalized Error Bounds", NDSS Symposium, 2017, pp. 1-15.

Hardt et al., "A Multiplicative Weights Mechanism for Privacy-Preserving Data Analysis", IEEE 51st Annual Symposium on Foundations of Computer Science, Oct. 23-26, 2010, pp. 61-70.

Hua et al., "Differentially private publication of general time-serial trajectory data", IEEE Conference on Computer Communications (INFOCOM), Apr. 26 -May 1, 2015, pp. 549-557.

Chatzikokolakis et al., "A Predictive Differentially-Private Mechanism for Mobility Traces", International Symposium on Privacy Enhancing Technologies Symposium, 2014, 20 pages.

Xiao et al., "Protecting Locations with Differential Privacy Under Temporal Correlations", Proceedings of the 22nd ACM SIGSAC Conference on Computer and Communications Security, Oct. 2015, pp. 1298-1309.

Chow et al., "Trajectory Privacy in Location-based Services and Data Publication", ACM SIGKDD Explorations Newsletter, vol. 13, No. 1, Jun. 2011, 11 pages.

Song et al., "Target Trajectory Prediction Based on Optimized Neural Network", 3rd IEEE International Conference on Computer and Communications (ICCC), Dec. 13-16, 2017, pp. 1956-1960.

Liu et al., "Trajectory Rotation Privacy Protection Algorithm Based on K Anonymity", Journal of Computer and Communications, vol. 6, Feb. 13, 2018, pp. 36-47.

International Search Report and Written Opinion received for corresponding Patent Cooperation Treaty Application No. PCT/CN2019/085903, dated Feb. 14, 2020, 9 pages.

Zhu, "Researches on differential privacy protection mechanisms for user trajectory data", Dissertation, May 23, 2018, 72 pages.

Extended European Search Report received for corresponding European Patent Application No. 19927815.1, dated Nov. 21, 2022, 7 pages.

Al-Molegi et al., "STF-RNN: Space Time Features-based Recurrent Neural Network for predicting people next location", IEEE Symposium Series on Computational Intelligence (SSCI), Dec. 6-9, 2016, 7 pages.

Ghosh, "Machine Learning and Privacy Preserving Algorithms for Spatial and Temporal Sensing", Thesis, 2019, 160 pages.

Li et al., "Differentially Private Publication Scheme for Trajectory Data", IEEE First International Conference on Data Science in Cyberspace (DSC), Jun. 13-16, 2016, pp. 596-601.

Intention to Grant for European Application No. 19927815.1 dated Mar. 15, 2024, 6 pages.

* cited by examiner

PRIVACY MANAGEMENT

RELATED APPLICATION

This application claims priority to PCT Application No. PCT/CN2019/085903, filed on May 7, 2019 which is incorporated herein by reference in its entirety.

FIELD

The present disclosure relates to management of user information and privacy thereof.

BACKGROUND

Mobile user devices are useful in providing a user with ability to access various services while on the move. Examples of suitable services are telephony, Internet and taxi services. Where the mobile device has the ability to determine its geographic location, or a network may determine it on the behalf of the device, these services may be enhanced for the user, for example, the user may be able to request a taxi without separately entering his present location.

On the other hand, the location-determination capability presents risks. In detail, the location and movement routes of the user are private information, which may be used to infer details of the user's life that he would prefer to not disclose. Such details may include hobbies, health status and personal relationships, for example. An attacker may seek to gain knowledge of the location data of a user by installing malware on the mobile device itself, by stealing the information from network nodes or by enticing the user to inadvertently disclose the data by agreeing to provide it by agreeing to terms of use, for example.

SUMMARY

According to some aspects, there is provided the subject-matter of the independent claims. Some embodiments are defined in the dependent claims.

According to a first aspect of the present disclosure, there is provided an apparatus comprising at least one processing core, at least one memory including computer program code, the at least one memory and the computer program code being configured to, with the at least one processing core, cause the apparatus at least to process a time series of location information elements, indicating a series of past locations of the apparatus, for input to an input layer of an artificial neural network, provide the processed time series of location information elements to the input layer of the artificial neural network, to obtain as output of the artificial neural network a predicted current location of the apparatus, and provide the predicted current location of the apparatus to a network entity as a current location of the apparatus.

According to a second aspect of the present disclosure, there is provided a method comprising processing, in an apparatus, a time series of location information elements, indicating a series of past locations of the apparatus, for input to an input layer of an artificial neural network, providing the processed time series of location information elements to the input layer of the artificial neural network, to obtain as output of the artificial neural network a predicted current location of the apparatus, and providing the predicted current location of the apparatus to a network entity as a current location of the apparatus.

According to a third aspect of the present disclosure, there is provided an apparatus comprising means for processing a time series of location information elements, indicating a series of past locations of the apparatus, for input to an input layer of an artificial neural network, providing the processed time series of location information elements to the input layer of the artificial neural network, to obtain as output of the artificial neural network a predicted current location of the apparatus, and providing the predicted current location of the apparatus to a network entity as a current location of the apparatus.

According to a fourth aspect of the present disclosure, there is provided a non-transitory computer readable medium having stored thereon a set of computer readable instructions that, when executed by at least one processor, cause an apparatus to at least process a time series of location information elements, indicating a series of past locations of the apparatus, for input to an input layer of an artificial neural network, provide the processed time series of location information elements to the input layer of the artificial neural network, to obtain as output of the artificial neural network a predicted current location of the apparatus, and provide the predicted current location of the apparatus to a network entity as a current location of the apparatus.

According to a fifth aspect of the present disclosure, there is provided a computer program configured to cause an apparatus to perform the following, when run: processing a time series of location information elements, indicating a series of past locations of the apparatus, for input to an input layer of an artificial neural network, providing the processed time series of location information elements to the input layer of the artificial neural network, to obtain as output of the artificial neural network a predicted current location of the apparatus, and providing the predicted current location of the apparatus to a network entity as a current location of the apparatus.

EMBODIMENTS

In accordance with the present disclosure, location privacy is enhanced by concealing a present location of a mobile device by providing, instead of the present location, a predicted location, the prediction being based on historical data or user movement patterns and a past location, or locations, of the user. An artificial neural network may be employed in the predicting. Further, noise may be introduced into the location data before it is provided from the mobile device, to make it more difficult for attackers to determine personal details from the location data while maintaining a level of utility from the provided location data.

Figure 1:
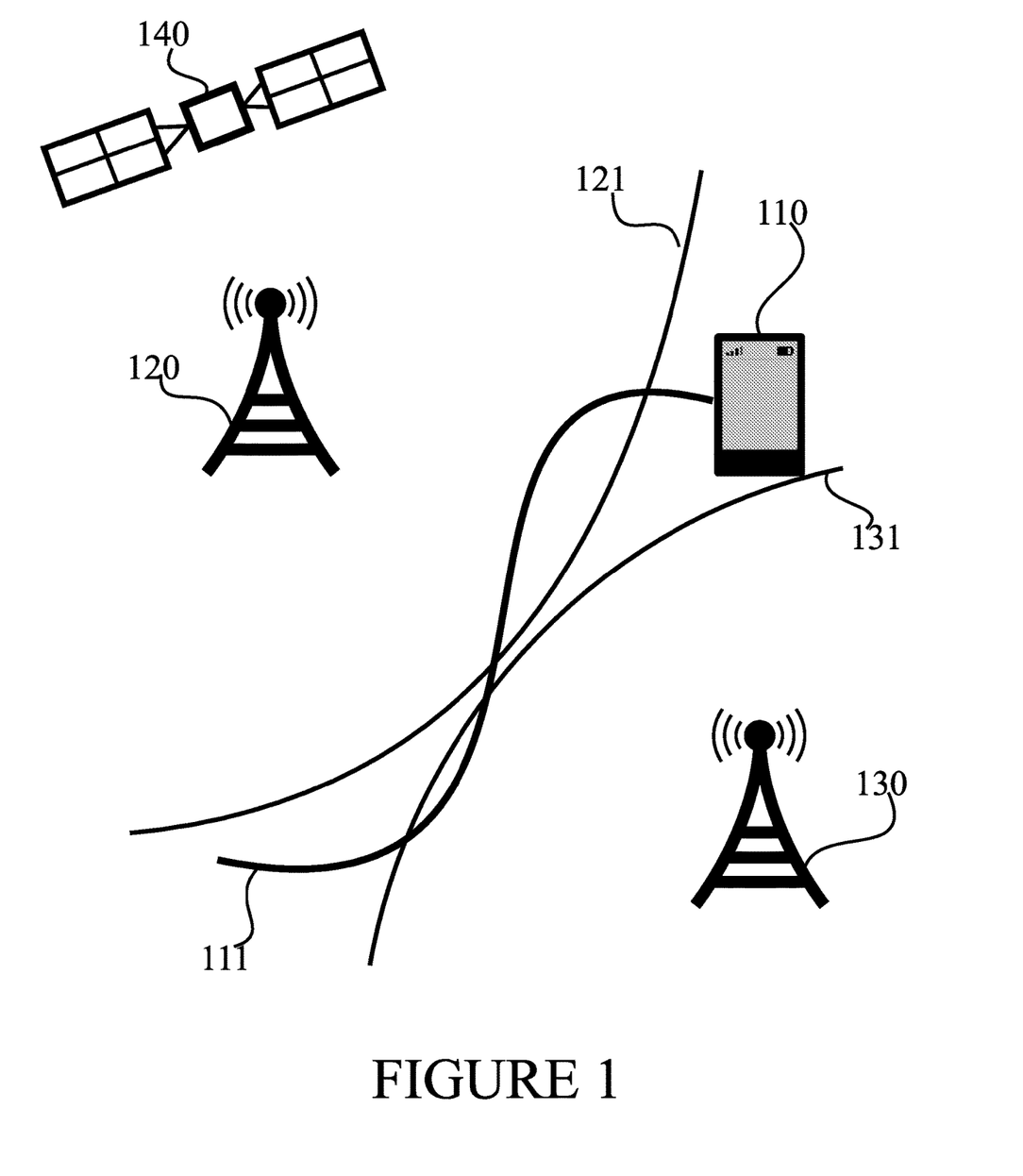
FIG. 1 illustrates an example system in accordance with at least some embodiments of the present invention.

FIG. 1 illustrates an example system in accordance with at least some embodiments of the present invention. Illustrated is mobile 110, which may comprise, for example, a smartphone, a smart watch, a laptop computer, a tablet computer, a data unit for installation in a car, an Internet of Things, IoT, node, or another suitable electronic device, for example. Mobile 110 is capable of determining its position, and a sequence of positions of mobile 110 forms a trajectory 111 of the mobile. Trajectory 111 may reveal locations where the mobile, and by extension the user of mobile 110, has been during the day and is thus highly private in nature. For example, a visit to a maternity hospital may imply the user is pregnant.

Mobile 110 may be configured to determine its location using one or more from among plural different methods. For example, where mobile 110 has a cellular communication capability, it may use a cellular communication network to determine its location. In some cellular communication networks, mobile 110 may request its location from the network, and be provided with an estimate of the location in return. Alternatively or in addition, mobile 110 may use multilateration techniques to determine its location from signals, such as broadcast signals, transmitted from base stations. Base stations 120 and 130 are illustrated in FIG. 1, and the cell edges of their cells are schematically illustrated as curves 121 and 131, respectively. As mobile 110 roams in a coverage area of the network, as along trajectory 111, it may repeatedly determine its location to compile the trajectory. Examples of cellular technologies include long term evolution, LTE, and fifth generation, 5G.

In addition or alternatively to the aforementioned techniques, mobile 110 may be equipped with a satellite positioning receiver, enabling use of a satellite constellation 140 in determining a location of mobile 110. Only one satellite is illustrated in FIG. 1 for the sake of clarity, although as the skilled person knows, positioning constellations may comprise several satellites. Examples of satellite positioning constellations include global positioning system, GPS, and the Galileo constellation.

Each time mobile 110 determines its location, it may generate a location information element, which may be provided with a timestamp indicating the time when it is generated. Thus by storing plural such location information elements, a time series and trajectory 111 may be generated.

As noted above, location-based service technologies are convenient to users, such as mobile users renting bicycles through terminals, inquiring about nearby restaurants, enjoying takeaways and using online taxi services, for example. These location-based services enable users to access real-time contextual information concerning their surroundings. However, location-based services may result in providing the user's location information to network entities, such as servers, and service providers cannot always guarantee that this user information will not be stolen. Potential adversaries may obtain personal privacy information such as the user's address and work information, which will result in a serious threat to user privacy. Servers providing location-based services may in principle be in any country and the user may be unable to know, where his location is being shared to.

In order to resolve the contradiction between location service quality and user privacy, researchers have proposed a number of privacy protection models, using techniques such as anonymity, generalization and frequency suppression. Differential privacy provides a solution to certain aspects of location privacy. The differential privacy model was proposed by Dwork in 2006 [1]-[2]. By randomly perturbing the published data, that is, by adding noise to the data, the attacker in a statistical sense cannot identify exact user trajectories regardless of his background knowledge. Specifically, the differential privacy model has the advantage of not requiring special attack hypotheses, not caring about the background knowledge possessed by the attacker and enabling quantitative analysis to represent the risk of privacy breaches.

In general, if the user's privacy is to be protected, the location-based server should not be provided with the user's accurate location information. On the other hand, to provide high-quality services to users, the user needs to provide the location-based server with accurate location information. Therefore, simultaneously optimizing service quality and user privacy is a challenge. In particular, there is a complex and non-linear relationship between the user trajectory 111 and time. Even if the location of mobile 111 at a single moment is protected by adding noise, the continuous trajectory will still have a high probability of exposing the user's true overall trajectory. Therefore, a secure and efficient privacy protection scheme is essential for trajectory privacy protection.

One example of existing work in the trajectory privacy protection field is by J. Hua [3] and M. Li [4] and aimed at a protection scheme based on the differential privacy idea. J. Hua et al. propose a differential privacy generalization algorithm for trajectories. Their well-designed exponential mechanism is used to probabilistically combine nodes based on a trajectory distance, and the data is released after differential data processing. Their algorithm not only maintains high data utility, but also can be applied to large data sets.

M. Li et al. noticed that random and unrestricted noise could lead to leak user privacy in existing privacy protection algorithms and used a trajectory statistical record merge method, publishing data that some trajectories were removed from the original data set, and proposed a new overall method. A private trajectory data release algorithm is described in his work, including a bounded noise-generation algorithm and a trajectory-merging algorithm. Although trajectory data privacy protection is involved, this research does not consider dynamic characteristics of trajectory data. At the same time, the large quantity of trajectory data processing leads to performance degradation of the privacy protection algorithm, which is an important consideration for trajectory data protection in practical applications involving real-life users.

The present document discloses a privacy scheme based on neural network prediction to address, at least in part, issues in existing schemes. More specifically, the disclosed method employs machine learning in trajectory privacy protection, optionally combining the differential privacy method with a neural network prediction phase. In some embodiments, the disclosed privacy scheme uses the user's speed attribute and establishes a multi-element model of user trajectory time, space, and speed. A differential privacy index mechanism may be used to facilitate the new trajectory privacy protection model.

In detail, a time series of past location values, which may comprise a set of timestamped coordinates, for example, may be collected by a mobile 110. The time series defines trajectory 111. The time series may be processed into a form suitable for input to an input layer of an artificial neural network, for example by rendering the time series into a matrix format comprising plural vectors, each vector representing a timestamped location, wherein each vector comprises a timestamp and plural co-ordinate values. The matrix may thus comprise a time series of location information elements in a form the neural network can accept. The neural network may comprise plural convolutional layers with filters arranged with coefficient values, which have been trained for prediction of user location based on past locations. The convolutional layers may be operably connected with the input layer, to read the time series of location information elements. An output layer of the neural network, operably connected with the convolutional layers, provides a predicted current location of mobile 110, based on the time series of past location values. A neural network may be a suitable choice for the prediction algorithm, since in practice the prediction may be accurate more than 80% of the time.

The neural network coefficients may be trained using historical trajectories of either plural users, and/or the user in question. The training may employ using backpropagation, BP. In some embodiments, the training is a continuous process in that the coefficients are updated using recorded trajectories 111 as additional training data, which may replace older training data in a training set, to enable the neural network to adapt to changes in user behaviour. The training may be performed on mobile 110 or in a remote server. Where the training is a continuous process, initial weights may be obtained to the neural network, and thereafter further training may be done on mobile 110, to avoid providing the user's trajectories 111 to the remote server for the training. In this case, at least some of the original training set used by the server may be provided to the mobile as well.

The predicted current location of mobile 110 may be provided from mobile 110 as a current location of the mobile. In other words, instead of disclosing an actual current location of mobile 110, mobile 110 provides a location of itself as predicted based on a past trajectory, for example, up until 10 minutes or 30 minutes ago. In this way, usually the location provided from the mobile is accurate, but a technical benefit is obtained in case the user deviates from his usual routine, as the deviation will be concealed from data transmitted from the mobile. This is so, since the neural network cannot predict the occasional deviation but will instead predict the user is engaged in his normal routine.

In some embodiments, statistical noise, such as zero-mean noise, may be added to the predicted location and/or the historical time series provided to the neural network as input. The statistical noise may have a Gaussian or Laplace distribution, for example.

Figure 2:
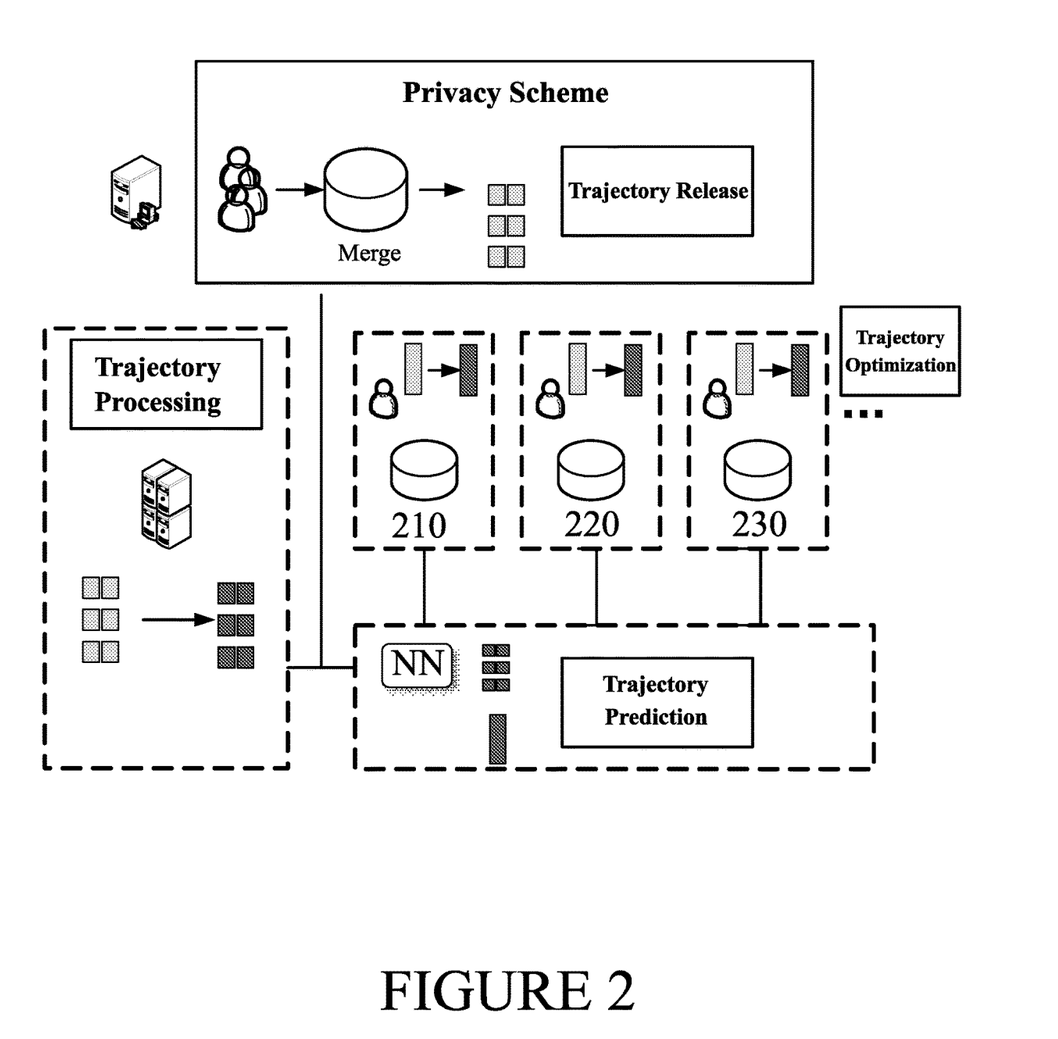
FIG. 2 illustrates an example system in accordance with at least some embodiments of the present invention.

In some embodiments, the predicted location is modified by replacing it with a centre point of a geographical region wherein the predicted location is comprised, before providing it from mobile 110. This may be done together with noise addition, or without noise addition. This may be referred to as spatial partitioning FIG. 2 illustrates an example system in accordance with at least some embodiments of the present invention. The system of FIG. 2, is relevant when concealing location information from an attacker with strong background knowledge.

Starting in the "Trajectory processing" box, unlike the traditional unmasked trajectory data set, this privacy scheme withholds the most sensitive information, namely the actual current location. A high-dimensional data vector, a matrix, may be established from the user's movement history, as described herein above. A general representative of a location record is shown in equations (1-2). x and y are location coordinates, t represents time and v is velocity.

$$\text{Location data} = \{x, y, t, v\} \quad (1)$$

$$\text{Trajectory } data_t : (x_{1m}, y_{1m}, t_{1m}, v_{1m}) \rightarrow \quad (2)$$
$$(x_{2m}, y_{2m}, t_{2m}, v_{2m}) \rightarrow \ldots \rightarrow (x_{im}, y_{im}, t_{im}, v_{im})$$

A noise addition mechanism may be used to add random noise t', which may satisfy the Laplace or Gaussian distribution, for example, to the time attribute t of the trajectory data to prepare for the user location prediction. Alternatively or in addition noise may be added to coordinate data. Where Trajectory $data_{t_S}$ in equation (3) is the trajectory data after the time attribute is processed by adding noise, and by adding the Laplacian noise $Lap(1/\epsilon\_2)$ to each time attribute, which can resist the attack behavior of the attacker who has some background knowledge of the user. Noise may be added before and/or after the neural network-based location prediction.

$$\text{Trajectory } data_{t_S} : \left(x_{1m}, y_{1m}, t_{1m} + \text{Lap}\left(\frac{1}{\epsilon_2}\right), v_{1m}\right) \rightarrow \quad (3)$$
$$\left(x_{2m}, y_{2m}, t_{2m} + \text{Lap}\left(\frac{1}{\epsilon_2}\right), v_{2m}\right) \rightarrow$$
$$\ldots \rightarrow (x_{im}, y_{im}, t_{im} + \text{Lap}(1/\epsilon_2), v_{im})$$

Moving to the trajectory prediction box, by learning a large number of samples from users, optionally combined with a current speed attribute, a neural network NN may be used to predict the current location of mobile 110, and this predicted location is used to conceal the actual current location. Trajectory $data_{t_{NN}}$ in equation (4) is a new trajectory data set predicted by the neural network, which can hide the original trajectory data set.

$$\text{Trajectory } data_{t_{NN}} (x_{1nn}, y_{1nn}, t_{1nn}, v_{1nn}) \rightarrow \quad (4)$$
$$(x_{2nn}, y_{2nn}, t_{2nn}, v_{2nn}) \rightarrow \ldots \rightarrow (x_{inn}, y_{inn}, t_{inn}, v_{in})$$

The following Algorithm 1 is an example algorithm usable in predicting the user trajectory:

```
01      for each data data_t
02        for each t in data_t ≠ 0
03          for (int i = T_k.max; i >= 1; --i)
04                  t = t++Lap(1/ε_2)
05          NN(data_{tNN}, data_{tS})
06        end for
07      end for
08    end for
09    return Trajectory data_{tNN}.
```

Here the function NN(output, input) is the neural network. Variable $data_{t_S}$ is the dataset into which noise has been added. Depending on the embodiment, time generalization 210, spatial partition 220 and/or partition selection 230 may be applied to the predicted current location. In some embodiments, the neural network is configured to output a predicted trajectory, instead of a single predicted current location. The predicted trajectory may comprise the predicted current location.

Advancing in FIG. 2 to the trajectory optimization box, for the new predicted trajectory, the time attribute may be generalized, and the approximate time may be merged into a time period, which may be divided into a fixed time region and a day can be divided into n such fixed timestamps. This may be done together with spatial partitioning, for example. In some embodiments, time is generalized to one location per hour throughout the day, for example, spatial partitioning is performed and trajectories of plural users are clustered, such that location data of close-by trajectories is overwritten to the same data, obscuring differences in locations between users.

In spatial partitioning, the location data of the same time stamp t is divided, and K-means clustering may be used to merge the location data of close-by trajectories. There are many possibilities for the merged location partitioning method. One example partitioning method is selection through an index mechanism in differential privacy. A differential private regional division algorithm is presented as Algorithm 2. The input is Trajectory T dataset D, and the output is generalized dataset DG.

```
01: if D = 0, then
02: return ⊥
03: end if
04: for each T in D
05:     Calculate the possible region partition cases :
        ($p_1, p_2 ... p_n$)
06: end for
07: for i 1 to n by 1 do
08:     Compute u(D,$p_i$)
09: end for
10: select the max u
11: determine the partition $p_{max}$
12: location partition
13: 1 ← the centre of $p_{max}$
14: return DG
```

According to the index mechanism, a region division may be performed. Each region has a unique central point. The points of the same region are merged as the designated central point, that is, written over with the central point. Finally, a new trajectory is issued. In order to verify the validity of the scheme and the availability of trajectory data, algorithm execution time average track merging time and average trajectory noise generation time can be used to measure these two aspects, if desired.

Advantages of the disclosed scheme include that it may be applied to analysis of users past trajectory, including using velocity. With the differential privacy publishing method of noise-mixed data, better analytical mining results can be obtained. A neural network may be configured to predict even fairly complex and non-linear trends in user trajectories. Continuing training enables the network to adapt to changes in movement habits. The differential value index mechanism may be used to process the predicted values, which is beneficial to defend against any background knowledge, and can solve the problem of low location service utility due to direct generalization. Increasing the effectiveness of the trajectory release, the present invention can save a lot of cost and can be well applied to practice.

Figure 3:
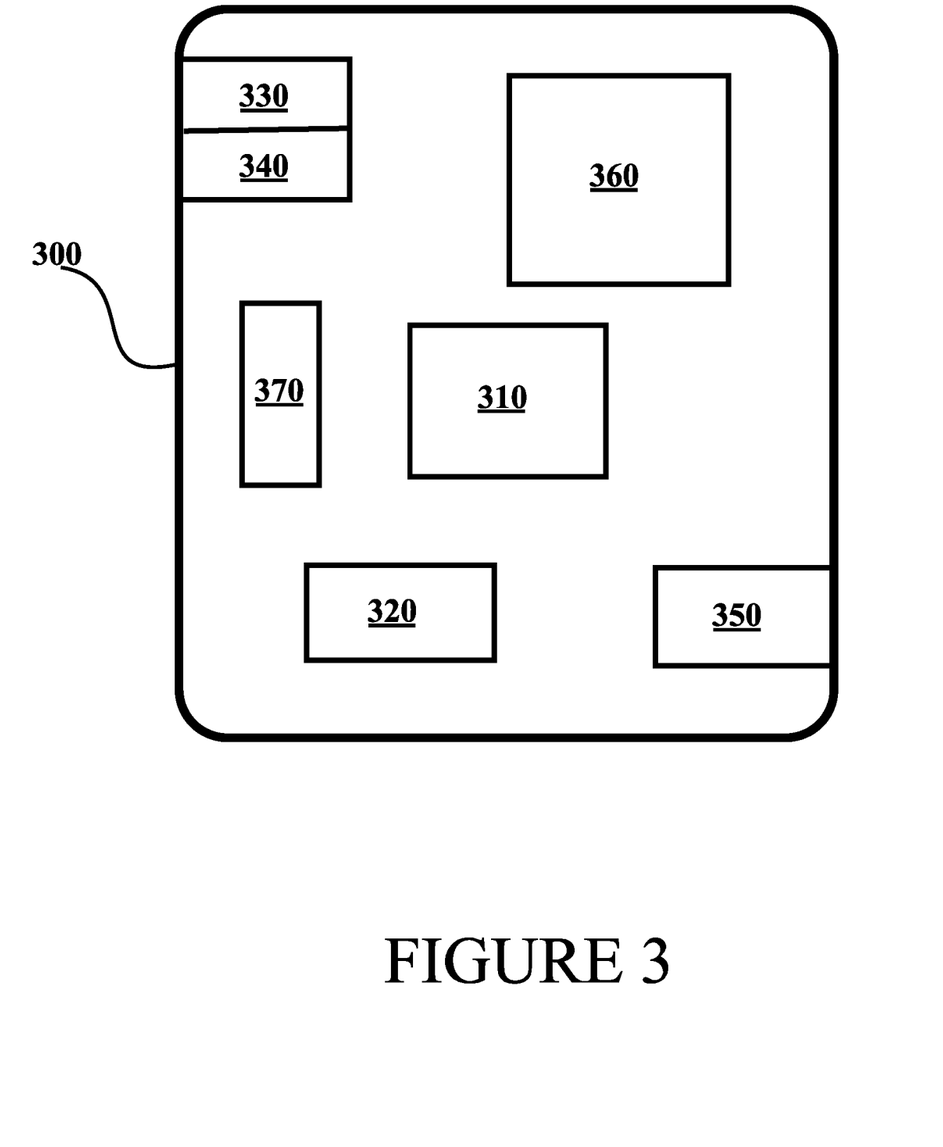
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as mobile 110 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to access location-based services, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
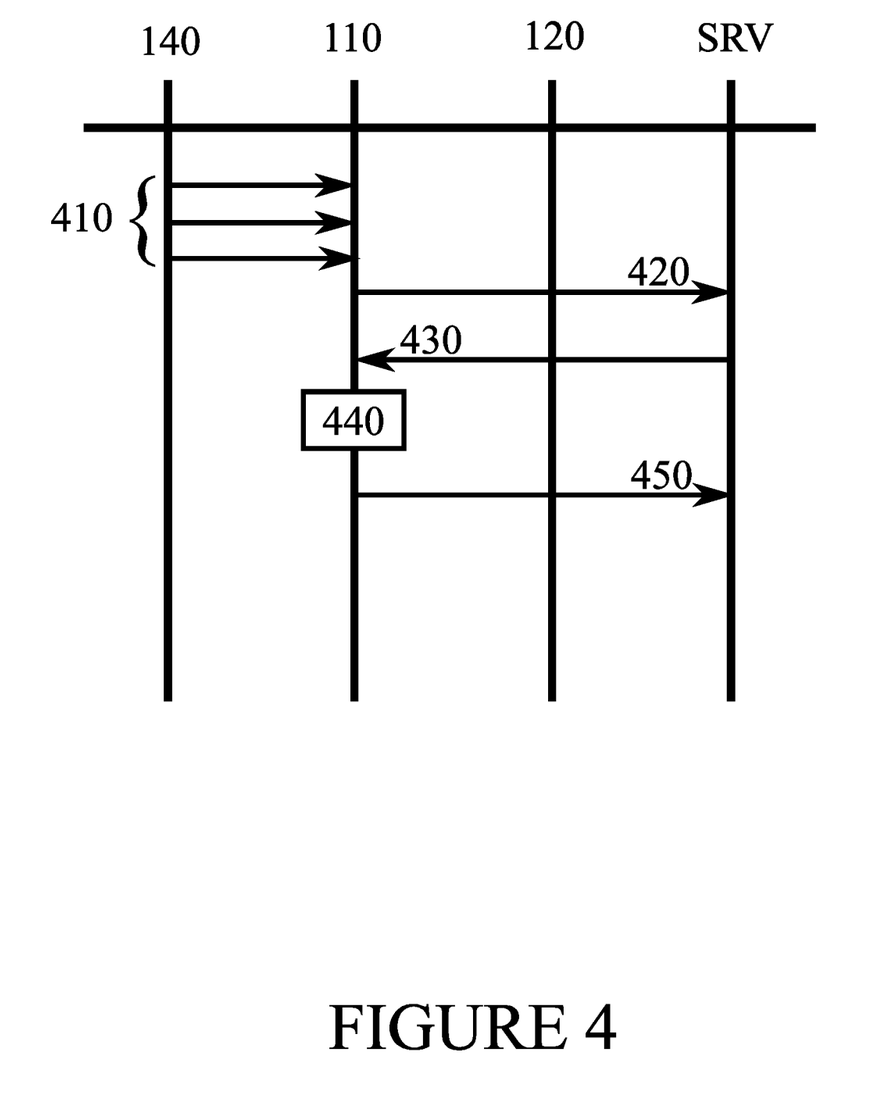
FIG. 4 illustrates signalling in accordance with at least some embodiments of the present invention.

FIG. 4 illustrates signalling in accordance with at least some embodiments of the present invention. On the vertical axes are disposed, from the left, satellite positioning constellation 140, mobile 110, base station 120 and location-based service provider, server SRV. Time advances from the top toward the bottom.

In phase 410, mobile 110 tracks its location as a function of time based on positioning signals it receives from satellite positioning constellation 140. Mobile 110 may store a time series of its locations, which collectively form a trajectory of mobile 110.

In phase 420, mobile 110 requests a location-based service from server SRV. The request may traverse base station 120, for example. Server SRV responds by querying a location of mobile 110, in phase 430. In response, mobile 110 performs the location privacy procedure disclosed herein in phase 440, in detail, it inputs at least part of the trajectory, for example excluding the current location, into the neural network and obtains as an output of the neural network a predicted current location of mobile 110. As another example, mobile 110 may exclude the most recent five or ten minutes of the trajectory from the input data to be provided to the neural network. Noise may be added before and/or after the neural network phase, that is, to the input data of the neural network and/or to the predicted current location output by the neural network.

In phase 450, the predicted current location of mobile 110 is provided to server SRV as a current location of mobile 110.

Figure 5:
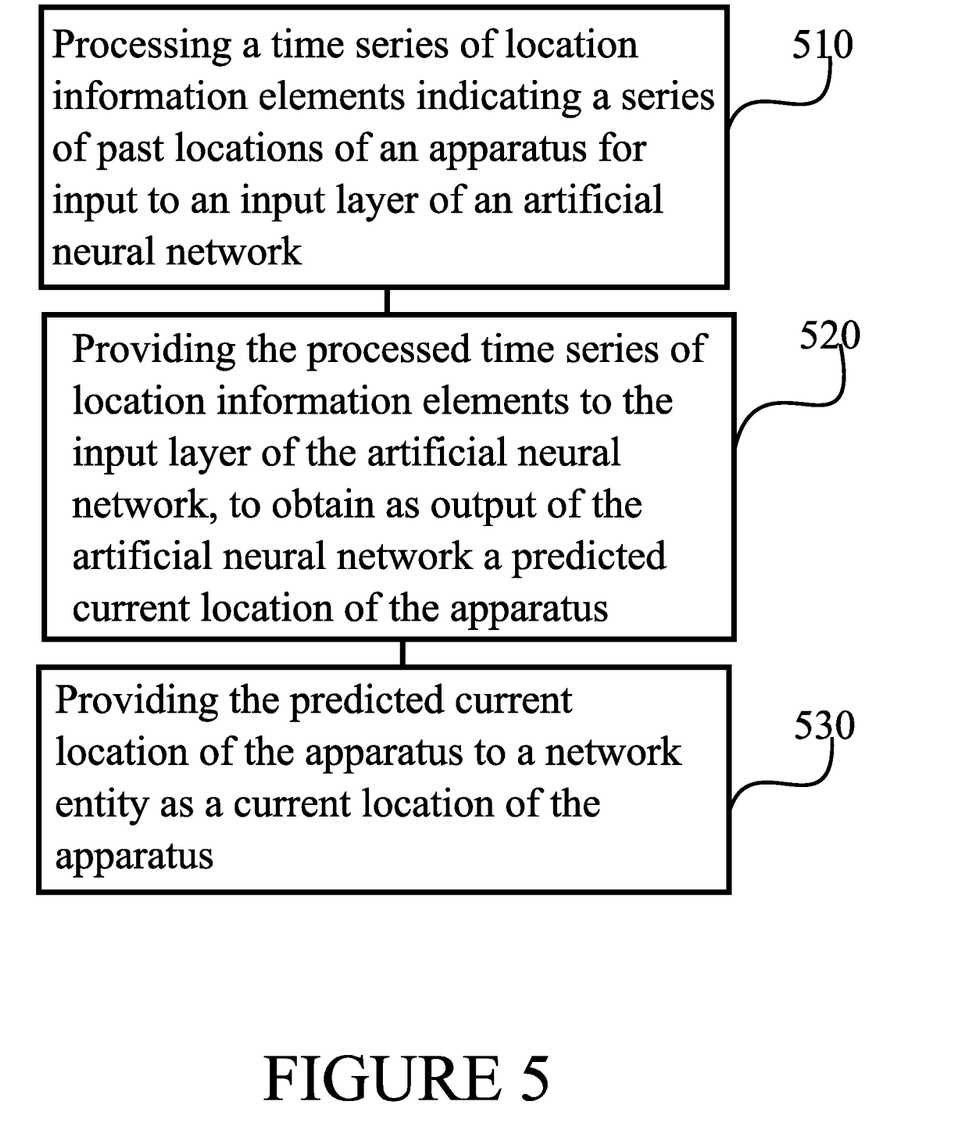
FIG. 5 is a flow graph of a method in accordance with at least some embodiments of the present invention.

FIG. 5 is a flow graph of a method in accordance with at least some embodiments of the present invention. The phases of the illustrated method may be performed in mobile 110, or in a control device configured to control the functioning thereof, when installed therein.

Phase 510 comprises processing, in an apparatus, a time series of location information elements, indicating a series of past locations of the apparatus, for input to an input layer of an artificial neural net a time series of location information elements work. Phase 520 comprises providing the processed time series of location information elements to the input layer of the artificial neural network, to obtain as output of the artificial neural network a predicted current location of the apparatus. Finally, phase 530 comprises providing the predicted current location of the apparatus to a network entity as a current location of the apparatus. The network entity may comprise the location-based service providing server, for example.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing user location privacy.

CITATION LIST

[1] C. Dwork. "Differential privacy." Lecture Notes in Computer Science, vol. 26, no. 2, pp. 1-12, 2006
[2] C. Dwork, F. McSherry, K. Nissim, et al., "Calibrating noise to sensitivity in private data analysis." in Proc. TCC, pp. 265-284, 2006.
[3] Hua J, Gao Y, Thong S. Differentially private publication of general timeserial trajectory data[C]// Computer Communications. IEEE, 2015:549-557
[4] Li M, Zhu L, Zhang Z, et al. Achieving Differential Privacy of Trajectory Data Publishing in Participatory Sensing[J]. Information Sciences, 2017(400-401):1-13.

What is claimed is:

1. An apparatus comprising at least one processor; and at least one memory including computer program code; the at least one memory and the computer program code configured to, with the at least one processor, cause the apparatus at least to perform:
    process a time series of location information elements, indicating a series of past locations of the apparatus, for input to an input layer of an artificial neural network, wherein the time series of location information elements excludes one or more most recent location information elements from the time series;
    provide the processed time series of the location information elements to the input layer of the artificial neural network, to obtain as output of the artificial neural network a predicted current location of the apparatus;
    modify the predicted current location of the apparatus before provision to a network entity by replacing the predicted current location with a different point of a geographical region within which the predicted current location is located; and
    provide the modified predicted current location of the apparatus to the network entity as a current location of the apparatus.

2. The apparatus according to claim 1, wherein the apparatus is configured to add statistical noise to the processed time series of the location information elements.

3. The apparatus according to claim 2, wherein the noise is in accordance with a Laplace distribution with mean zero.

4. The apparatus according to claim 1, wherein the different point comprises a center point of the geographical region wherein the predicted location is comprised.

5. The apparatus according to claim 1, wherein the apparatus is further configured to obtain weights of the artificial neural network either by receiving them from a configuration node, or by training them with a set of historical time series of location information elements of the apparatus.

6. The apparatus according to claim 1, wherein the apparatus is further configured to obtain the time series of the location information elements from a positioning device comprised in the apparatus.

7. The apparatus according to claim 6, wherein the positioning device comprises a satellite positioning receiver.

8. A method comprising:
    processing a time series of location information elements, indicating a series of past locations of an apparatus, for input to an input layer of an artificial neural network, wherein the time series of location information elements excludes one or more most recent location information elements from the time series;
    providing the processed time series of the location information elements to the input layer of the artificial neural network, to obtain as output of the artificial neural network a predicted current location of the apparatus;
    modifying the predicted current location of the apparatus before provision to a network entity by replacing the predicted current location with a different point of a geographical region within which the predicted current location is located; and
    providing the modified predicted current location of the apparatus to the network entity as a current location of the apparatus.

9. The method according to claim 8, further comprising adding statistical noise to at least one of the processed time series of the location information elements or the predicted current location.

10. The method according to claim 9, wherein the noise is in accordance with a Laplace distribution with mean zero.

11. The method according to claim 8, wherein the different point comprises a center point of the geographical region wherein the predicted location is comprised.

12. The method according to claim 8, further comprising obtaining weights of the artificial neural network either by receiving them from a configuration node, or by training them with a set of historical time series of the location information elements of the apparatus.

13. The method according to claim 12, further comprising training the weights using backpropagation.

14. The method according to claim 8, further comprising obtaining the time series of location information elements from a positioning device comprised in the apparatus.

15. The method according to claim 14, wherein the positioning device comprises a satellite positioning receiver.

16. A non-transitory computer readable medium comprising program instructions for causing an apparatus to perform at least the following:

processing a time series of location information elements, indicating a series of past locations of the apparatus, for input to an input layer of an artificial neural network, wherein the time series of location information elements excludes one or more most recent location information elements from the time series;

providing the processed time series of the location information elements to the input layer of the artificial neural network, to obtain as output of the artificial neural network a predicted current location of the apparatus;

modifying the predicted current location of the apparatus before provision to a network entity by replacing the predicted current location with a different point of a geographical region within which the predicted current location is located; and providing the modified predicted current location of the apparatus to the network entity as a current location of the apparatus.

17. The apparatus according to claim 1, wherein the apparatus is configured to add statistical noise to the predicted current location.

18. The apparatus according to claim 1, wherein the time series of location information elements is processed by rendering the time series into a matrix format comprising a plurality of vectors, wherein respective ones of the plurality of vectors represent a timestamped location, and wherein respective ones of the plurality of vectors comprise a timestamp and a plurality of coordinate values.

* * * * *